UNITED STATES PATENT OFFICE.

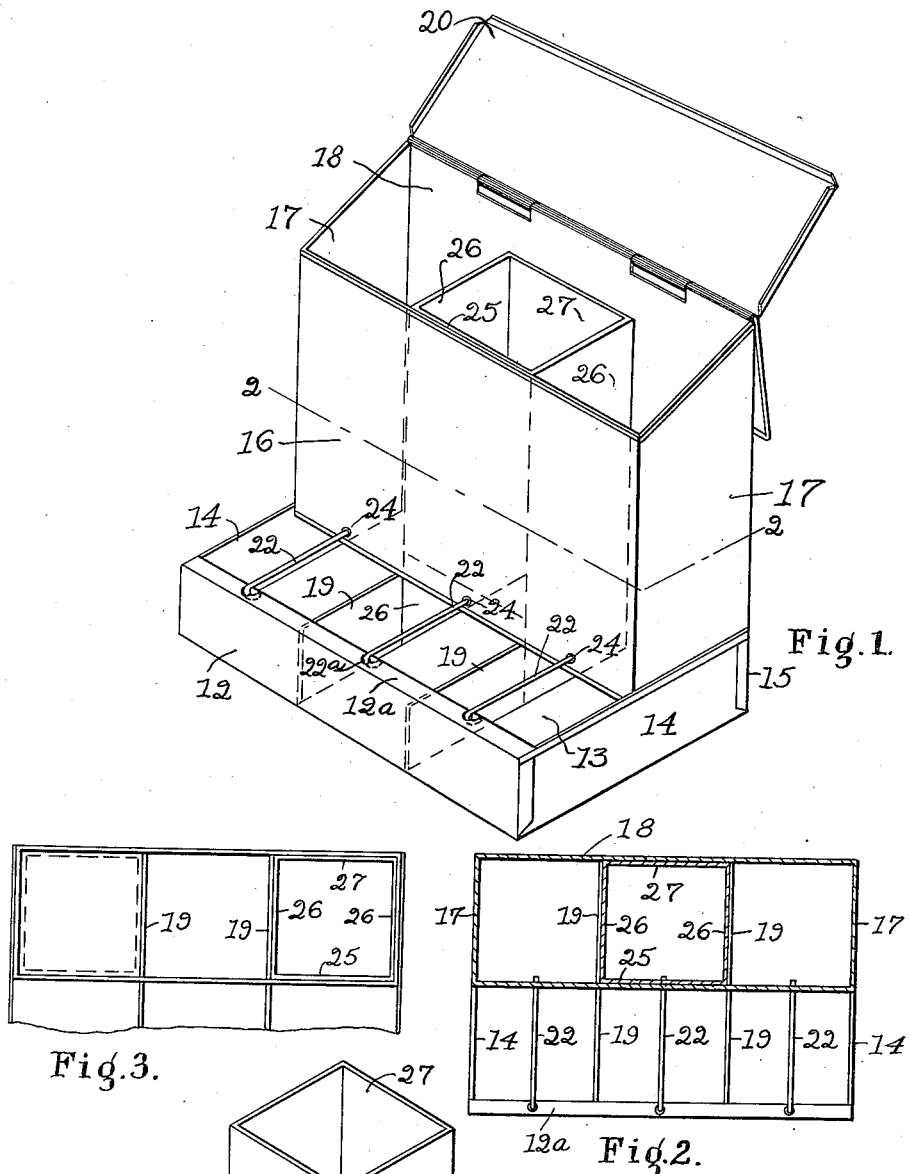

CHARLES H. FELKER, OF AVON, MASSACHUSETTS.

DRY-FOOD HOPPER.

1,022,668.

Specification of Letters Patent. Patented Apr. 9, 1912.

Application filed September 15, 1911. Serial No. 649,547.

*To all whom it may concern:*

Be it known that I, CHARLES H. FELKER, a citizen of the United States, and a resident of Avon, in the county of Norfolk and State of Massachusetts, have invented certain new and useful Improvements in Dry-Food Hoppers, of which the following is a specification.

This invention relates to magazine feed devices, especially for feeding chickens and other fowl, the device being particularly devised for holding mixtures of dry food in such manner that chickens can eat sufficient quantities of the food without scattering it on the ground.

The invention has for its objects to provide means for permitting free access to the stored food without liability of injury to the bills of the chickens and to enable the reservoir portion of the hopper to be conveniently subdivided into two or more compartments, each adapted to hold a different kind of food.

The invention consists in the improvements which I will now proceed to describe and claim.

Of the accompanying drawings which form a part of this specification:—Figure 1 represents a perspective view of a dry-food hopper embodying my invention; Fig. 2 represents a horizontal section on line 2—2 of Fig. 1, showing the reservoir subdivided into three compartments; Fig. 3 represents a view similar to Fig. 2, showing the reservoir subdivided into two compartments; Fig. 4 represents a perspective view of the box which subdivides the reservoir.

Similar reference characters indicate the same parts in all the figures.

My improved hopper comprises a trough-shaped sheet metal base having a front wall 12, a bottom 13, complemental end walls 14, and a rear wall 15, all of which constitutes a rectangular pan adapted to receive dry food stored in the reservoir hereinafter described. The reservoir which is also of sheet metal comprises a front wall 16, end walls 17, and a rear wall 18, said walls being substantially vertical and constituting a reservoir which covers a part of the base and is rigidly attached thereto, the end walls 17 being soldered or otherwise rigidly secured to the end walls 14 of the base, while the rear wall 18 is similarly secured to the rear wall 15 of the base, and is practically flush with the latter. The base is provided with a suitable number of transverse partitions 19, preferably two, extending across the base from the front wall 12 to the rear wall 15, said partitions subdividing the base into a plurality of compartments, three of which are shown in the present instance, the compartments being of uniform width. The reservoir is provided with a cover 20 which is hinged to the rear wall 18. The lower end of the front wall 16 is elevated above the bottom of the base so that the interior of the reservoir communicates with each of the compartments of the base. Food inserted in the reservoir is therefore adapted to pass therefrom to the front portions of the base compartments which are open and accessible to the chickens.

To prevent the chickens in withdrawing the food from moving their heads laterally and thus scattering the food, I provide guard rods 22, which are preferably lengths of stout wire extending from the front wall 12 of the base to the front wall 16 of the reservoir midway between the ends of the compartments of the base, the rods alternating with the sides of the compartments formed by the end walls 14 and partitions 19. Said rods coöperate with the walls 14 and partitions 19 in forming relatively large openings which permit the free entrance of the bills of the chickens into the compartments, and prevent the chickens from moving their bills laterally and thus scattering the food. The said rods, end walls, and partitions are substituted for the usual grids of woven wire which are placed over the open portion of a trough-shaped base in a device of this character. The grids heretofore employed, by reason of the small openings afforded by them, are liable to injure the bills of the chickens owing to the tendency of the chickens to strike the wires and especially those extending lengthwise of the reservoir.

The rods 22 are preferably provided with hooks 22ᵃ at their outer ends, which pass through orifices in a flange 12ᵃ on the front wall 12, as indicated by Fig. 1. The rear ends of the rods 22 pass loosely through orifices 24 in the front wall 16 of the reservoir. Said wall is made of sheet metal, as are all the walls above mentioned, and is sufficiently flexible to enable it to be sprung inwardly preparatory to the engagement of the rods therewith, the preferred procedure being to engage the hooks of the rods with the flange 12ª, then spring the front wall inwardly until the orifices 24 are in position to receive the rear ends of the rods 22, when by releasing the front wall 16, it will spring outwardly and thus cause the inner ends of the rods to enter the orifices 24.

I provide a box adapted to be removably inserted in the reservoir, for the purpose of subdividing the latter into two or more compartments, each communicating with one or more compartments of the base. Said box is composed of a front wall 25, side walls 26, and a rear wall 27, the whole forming a box adapted to be inserted between the front and rear walls of the reservoir and to enter either of the compartments of the base. The lower ends of the side and rear walls of the base rest upon the bottom of the base, and the lower end of the front wall 25 of the box is elevated above the lower ends of the other walls to form an outlet at the lower end of the front of the box, permitting the interior of the box to communicate with the base compartment in which it is inserted.

When the box is inserted in the central portion of the reservoir, as shown by Fig. 2, it subdivides the reservoir into three compartments, the central one of which is formed by the box. When the box is inserted in one end of the reservoir, as shown by Fig. 3, it converts the reservoir into two compartments, one of which is formed by the box and the other by the body of the reservoir. The box may be inserted in either end of the reservoir, as indicated by full and dotted lines in Fig. 3. The partitions 19 extend across the portion of the base in which the lower end of the box is inserted and form stops adapted to prevent sidewise movement of the box.

It will be seen that the box enables the hopper to contain two or more different kinds of food, either of which may be eaten by the chickens. When only one kind of food is used, the box may be removed if desired, although its presence is not objectionable, its walls being of sheet metal and therefore taking up but little room in the reservoir.

I claim:

1. A dry-food hopper comprising a trough-shaped base, transversely partitioned to convert its interior into a plurality of compartments, and having an inwardly projecting flange on its front wall, the front portions of the compartments being open, a reservoir located over the rear portion of the base and having a flexible front wall, the lower end of which is elevated above the bottom of the base and offset from the front wall of the base, and guard rods having hooked ends engaged with the said flange and extending therefrom to the front wall of the reservoir and through orifices therein, the flexibility of the front wall of the reservoir permitting the engagement of the rods therewith, substantially as described.

2. A dry-food hopper comprising a trough-shaped base, having transverse partitions which convert its interior into a plurality of compartments, the front portions of the compartments being open, a reservoir located over the rear portion of the base and communicating with the rear portions of the compartments, the lower end of the front wall of the reservoir being elevated above the bottom of the base, and a box formed to enter the reservoir and either compartment of the base, and to bear on the bottom of the base, the box being separable from the reservoir and adapted to divide the reservoir into two or more compartments, one of which is formed by the box, the lower end of the box being provided with an outlet communicating with the front portion of the base compartment in which it is inserted, and each of said partitions constituting a stop adapted to prevent sidewise movement of the box.

In testimony whereof I have affixed my signature, in presence of two witnesses.

CHARLES H. FELKER.

Witnesses:
C. F. BROWN,
P. W. PEZZETTI.

---

Copies of this patent may be obtained for five cents each, by addressing the "Commissioner of Patents, Washington, D. C."